(12) United States Patent
Lapis

(10) Patent No.: US 11,390,265 B2
(45) Date of Patent: Jul. 19, 2022

(54) METHOD FOR PREVENTING ROLL-OVER OF A MOTOR VEHICLE BY MEANS OF TORQUE VECTORING

(71) Applicants: thyssenkrupp Presta AG, Eschen (LI); thyssenkrupp AG, Essen (DE)

(72) Inventor: Leonard Lapis, Sennwald (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 70 days.

(21) Appl. No.: 16/957,424

(22) PCT Filed: Jan. 15, 2019

(86) PCT No.: PCT/EP2019/050865
§ 371 (c)(1),
(2) Date: Jun. 24, 2020

(87) PCT Pub. No.: WO2019/141649
PCT Pub. Date: Jul. 25, 2019

(65) Prior Publication Data
US 2020/0339099 A1   Oct. 29, 2020

(30) Foreign Application Priority Data
Jan. 19, 2018  (DE) ..................... 10 2018 101 182.2

(51) Int. Cl.
*B60W 10/20*   (2006.01)
*B60W 30/04*   (2006.01)

(52) U.S. Cl.
CPC ............ *B60W 10/20* (2013.01); *B60W 30/04* (2013.01); *B60W 2030/043* (2013.01);
(Continued)

(58) Field of Classification Search
CPC ................ B60W 10/20; B60W 30/04; B60W 2030/043; B60W 2520/406;
(Continued)

(56) References Cited

U.S. PATENT DOCUMENTS 6,438,464 B1 *   8/2002   Woywod ............ B60G 17/0162
                                                   701/1
11,136,021 B1 *  10/2021   Funke ................... B60W 30/04
(Continued)

FOREIGN PATENT DOCUMENTS

DE     10 2004 046 985 A    9/2005
DE     10 2005 046 776 A    4/2006
(Continued)

OTHER PUBLICATIONS

DE-102005048718-A9 translation (Year: 2007).*
(Continued)

*Primary Examiner* — Jeff A Burke
*Assistant Examiner* — Kyle T Johnson
(74) *Attorney, Agent, or Firm* — thyssenkrupp North America, LLC

(57) ABSTRACT

Systems and methods for preventing roll-over of a motor vehicle in the event of a transverse load change. The motor vehicle has an individual-wheel drive designed to drive a wheel that is loaded by the transverse load change independently of the at least one other wheel of the motor vehicle. One methods includes identifying a critical state of the motor vehicle in the event of a transverse load change, applying a drive torque by the individual-wheel drive to the motor vehicle wheel that is loaded by the transverse load change such that the wheel that is loaded by the transverse load change is caused to slip, and steering the motor vehicle wheel that is loaded by the transverse load change in the
(Continued)

direction of the direction of travel such that a roll-over of the motor vehicle can be prevented.

8 Claims, 3 Drawing Sheets

(52) U.S. Cl.
CPC ... *B60W 2520/406* (2013.01); *B60W 2710/20* (2013.01); *B60W 2720/266* (2013.01); *B60W 2720/406* (2013.01)

(58) Field of Classification Search
CPC ....... B60W 2710/20; B60W 2720/266; B60W 2720/406; B60W 2520/125; B60W 2520/30; B60W 2710/083; B60W 2710/207; B60W 2720/30; B60G 2800/213; B60G 2800/963; B60G 2800/965; B60K 23/04; B60K 2023/043; B60K 7/0007; B60T 2230/03; B60Y 2200/91; B60Y 2300/02; B60Y 2300/82
See application file for complete search history.

(56) References Cited

U.S. PATENT DOCUMENTS

| | | | | |
|---|---|---|---|---|
| 2004/0254703 | A1* | 12/2004 | Traechtler | B60T 8/17554 701/38 |
| 2006/0074530 | A1* | 4/2006 | Meyers | B60W 30/04 701/1 |
| 2007/0184929 | A1* | 8/2007 | Piyabongkarn | F16H 48/08 475/84 |
| 2008/0082246 | A1* | 4/2008 | Brown | B60W 30/045 701/91 |
| 2008/0234912 | A1* | 9/2008 | Choi | B60T 8/246 701/83 |
| 2015/0005982 | A1* | 1/2015 | Muthukumar | G01P 15/00 701/1 |
| 2020/0339099 | A1* | 10/2020 | Lapis | B60K 7/0007 |

FOREIGN PATENT DOCUMENTS

| | | | | |
|---|---|---|---|---|
| DE | 102005048718 A9 * | 4/2007 | | B60R 21/0132 |
| DE | 10 2008 002 361 A | 12/2009 | | |
| DE | 10 2010 017 647 A | 1/2011 | | |
| DE | 10 2009 045 234 A | 4/2011 | | |
| KR | 960000248 B1 * | 1/1996 | | B60W 10/06 |
| WO | WO-9937516 A1 * | 7/1999 | | B60T 8/17554 |
| WO | 2006/026259 A | 3/2006 | | |
| WO | 2009/149974 A | 12/2009 | | |

OTHER PUBLICATIONS

WO-9937516-A1 (Year: 1999).*
KR-960000248-B1 (Year: 1996).*
Motor Torque control algorithm to prevent rollover for in-wheel drive electric vehicle (Year: 2016).*
Active Driveline Torque Management Systems (Year: 2010).*
Minimizing Dynamic Rollover Propensity with Electronic Limited Slip Differentials (Year: 2006).*

* cited by examiner

METHOD FOR PREVENTING ROLL-OVER OF A MOTOR VEHICLE BY MEANS OF TORQUE VECTORING

CROSS REFERENCE TO RELATED APPLICATIONS

This application is a U.S. National Stage Entry of International Patent Application Serial Number PCT/EP2019/050865, filed Jan. 15, 2019, which claims priority to German Patent Application No. DE 10 2018 101 182.2, filed Jan. 19, 2018, the entire contents of both of which are incorporated herein by reference.

FIELD

The present disclosure generally relates to a method for preventing roll-over of a motor vehicle in the event of a transverse load change.

BACKGROUND

In steer-by-wire steering systems, the position of the steered wheels is not coupled directly to the steering input means, for example a steering wheel. There is a connection between the steering wheel and the steered wheels via electrical signals. The driver's steering request is tapped by a steering angle sensor and the position of the steered wheels is controlled in accordance with the driver's steering request by means of a steering actuator.

In order to avoid unstable driving situations, such as oversteering or understeering, what is referred to as "torque vectoring" is known in which a drive torque is distributed between a left and a right vehicle wheel by means of a specially designed differential transmission, in order thereby to counteract the understeering or oversteering. Therefore, if a wheel is braked in an unstable driving situation while the drive force is being conducted to the wheel which has the greatest reduction in yawing moment, that is to say if understeering occurs, the controller applies more drive force to the wheel on the outside of the bend via a separate clutch, and therefore the vehicle is "pushed" into the bend. A severe transverse load change may result in the wheel on the inside of the bend simultaneously being completely relieved of load and the wheel on the outside of the bend being completely loaded. The loaded wheel may transmit a transverse force which is sufficient to tip the motor vehicle over.

Roll-over stabilization (ARS) is known from the prior art, in which the front wheel on the outside of the bend is braked in critical situations or in the event of the risk of roll-over, such that the lateral force on said wheel is reduced. At the same time, braking of said wheel gives rise to a yawing moment about the vertical axis of the vehicle, said yawing moment counteracting the cornering of the vehicle. The reduction in the lateral force and the production of the yawing moment reduce the transverse acceleration, thus making it possible to lower the risk of roll-over. This solution has proven disadvantageous in that the vehicle slips out of the bend with understeering via the front wheel and, in addition, the vehicle speed is reduced because of the braking.

Thus a need exists for an improved steer-by-wire steering system and method for preventing roll-over of a motor vehicle in the event of a severe transverse load change.

DETAILED DESCRIPTION

Figure 1:
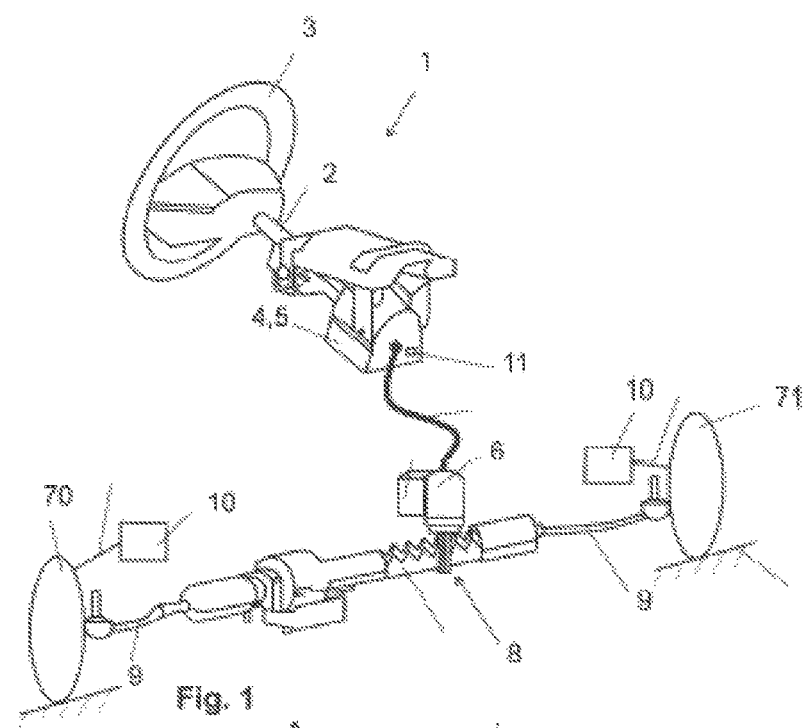
FIG. 1 is a schematic view of a steer-by-wire steering system having two separate wheel drives on the front axle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for preventing roll-over of a motor vehicle in the event of a transverse load change having the features of the preamble of the independent claim and to a steer-by-wire steering system of a motor vehicle.

According thereto, a method for avoiding roll-over of a motor vehicle in the event of a transverse load change is provided, wherein the motor vehicle has an individual-wheel drive which is designed to drive a wheel that is loaded by the transverse load change independently of the at least one other wheel of the motor vehicle, wherein the following method steps are provided:
  Identifying a critical state of the motor vehicle in the event of a transverse load change,
  Applying a drive torque by an individual-wheel drive to the motor vehicle wheel that is loaded by the transverse load change in such a manner that the wheel that is loaded by the transverse load change is caused to slip, and
  Steering the motor vehicle wheel that is loaded by the transverse load change in the direction of a direction of travel in such a manner that a roll-over of the motor vehicle can be prevented.

The motor vehicle is caused to slide by said method, but does not tip over. The drive torque is preferably the maximum torque of a motor vehicle. It is preferred here if the drive torque drives the wheel that is loaded by the transverse load change in the direction of travel.

In a preferred embodiment, the application of the drive torque and the steering of the wheel that is loaded by the transverse load change take place for a limited period of time which is at least as long as a critical state lasts.

In particular, the limited period of time lies within a range of between 0.1 s and 0.3 s.

In a preferred embodiment, the application of the drive torque and the steering of the wheel that is loaded by the transverse load change take place in an automatic steering state of the motor vehicle steering system.

In the event of cornering, the wheel that is loaded by the transverse load change is the wheel on the outside of the bend.

Furthermore, a steer-by-wire steering system of a motor vehicle having a steerable front wheel axle having two steerable wheels is provided, wherein the front wheel axle has an individual-wheel drive which uses a drive controller to individually drive wheel drives assigned to the steerable wheels, and wherein an electric steering actuator is provided which controls the position of the steerable wheels, wherein the drive controller and the steering actuator are designed as to carry out the previously described method.

FIG. 1 shows a steer-by-wire steering system 1. A rotational angle sensor (not illustrated) is mounted on a steering shaft 2 and senses the driver's steering angle applied by turning a steering input means 3, which is designed in the example as a steering wheel. However, a steering torque can additionally also be detected. Furthermore, a feedback actuator 4 is mounted on the steering shaft 2 and serves to simulate feedback effects from the roadway to the steering wheel 3 and therefore to provide the driver with feedback about the steering and driving behavior of the vehicle. The driver's steering request is transmitted to a steering control unit 5 via signal lines by means of the rotational angle of the steering shaft 2 that is measured by the rotational angle sensor, said steering control unit 5 activating, as a function of further input variables, an electrical steering actuator 6 which controls the position of the steered wheels 70, 71. The steering actuator 6 acts indirectly on the steered wheels 70, 71 via a steering rod steering mechanism 8, for example a toothed-rack steering mechanism, and via track rods 9 and other components. The steerable wheels 70, 71 are assigned drive motors 10 which separately drive the wheels 70, 71 in the form of an individual-wheel drive. A drive controller 11 determines the drive torques for the steerable wheels 70, 71 with reference to the rotational angle of the steering shaft 2 measured by the rotational angle sensor and further signals and correspondingly activates the respective drive motor 10.

Figure 2:
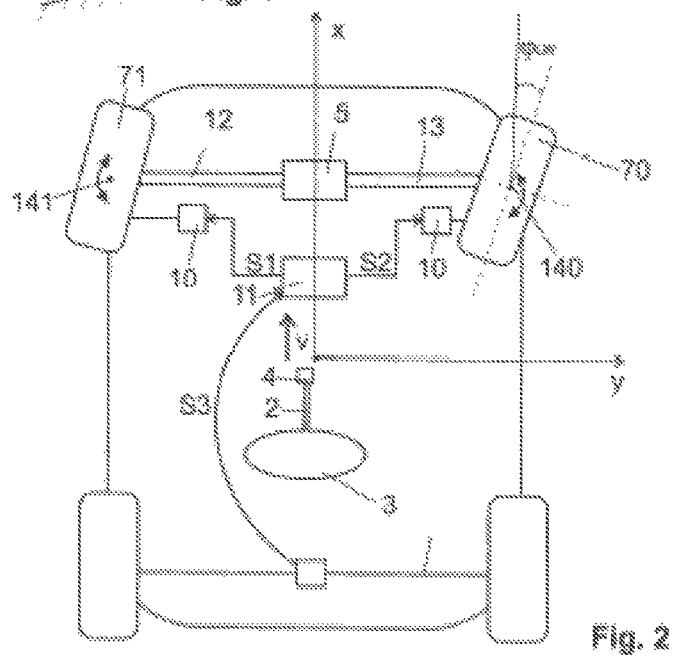
FIG. 2 is a schematic top view of a steer-by-wire steering system.

FIG. 2 schematically illustrates the motor vehicle with the two axles, wherein the drive of the steerable wheels 70, 71 is arranged on the front axle 12. The front axle 12 comprises, with respect to a direction of travel, a first steerable wheel 71 and a second steerable wheel 70 which are connected to each other via the toothed rack 13 of the toothed rack steering mechanism. When the toothed rack 13 is shifted to the right or left transversely with respect to the direction of travel x, the wheels are pivoted about a respective pivot point 140, 141. A first drive motor 10 is arranged on the left in the direction of travel and a second drive motor 10 is arranged on the right in the direction of travel. The wheel drive motors 10 are connected to the steerable wheels 70, 71 via respective drive shafts. The wheel drive motors 10 are preferably electric motors. The drive controller 11 activates the first drive motor 10 via a first signal line S1 and activates the second drive motor 10 via a second signal line S2. In addition, the drive controller 11 receives information about the state of the rear axle via a signal line S3. The vehicle moves in the direction of travel x at a speed v.

A critical load change which could lead to a roll-over of the motor vehicle is identified with reference to the measured transverse acceleration of the motor vehicle and the known variables of the mass, the track width and the height of the center of gravity. When the critical state is identified, the change from a manual steering state into an automatic steering state takes place. "Manual steering state" is understood in this case as meaning that the driver turns in the wheels by actuation of the steering wheel. Assistance systems can influence the turning in of the wheels. By contrast, in the automatic steering state, the steer-by-wire steering system takes over the activation of the wheels irrespective of the steering input at the steering wheel. The automatic steering state is maintained for a limited period of time Δt, specifically for as long as the critical state lasts, preferably within a range of between 0.1 s and 0.3 s.

Figure 3:
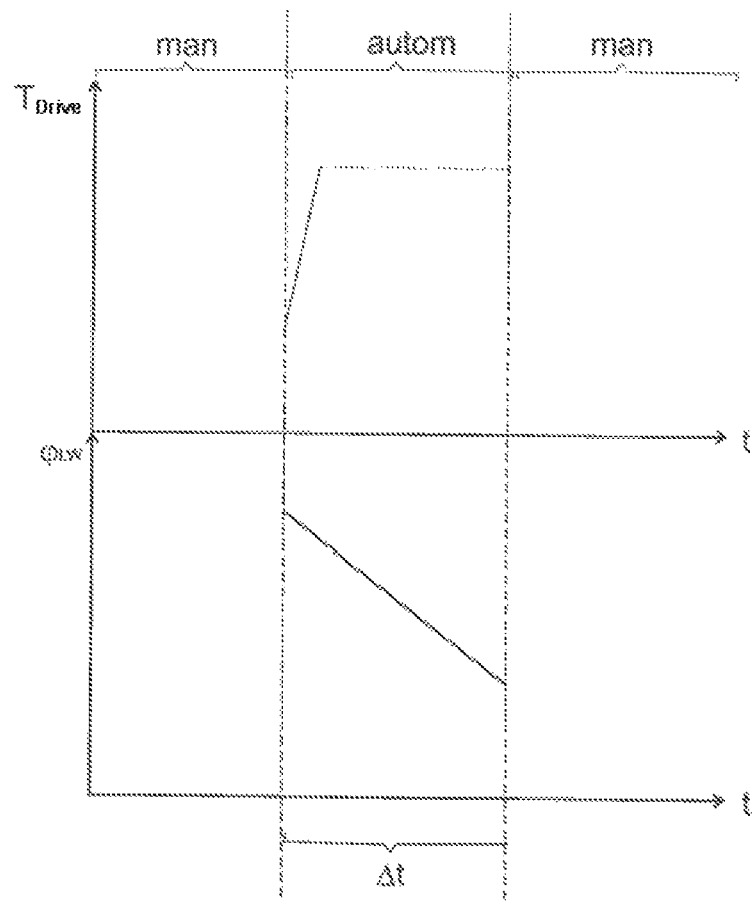
FIG. 3 is a diagram of the time profile of torque and wheel steering angle for activating the wheel on the outside of the bend.

During the automatic steering state, a torque $T_{Drive}$ and a wheel steering angle $\varphi_{LW}$ are applied to the loaded wheel on the outside of the curve. FIG. 3 shows the time profile of the torque $T_{Drive}$ and of the wheel steering angle $\varphi_{LW}$. The drive torque $T_{Drive}$ rotates the loaded wheel in the direction of travel x. The applied drive torque $T_{Drive}$, the torque which is maximally available from the drive motor 10 and which can briefly also go beyond the permanent torque, is preferred. The loaded wheel is thereby caused to slip. The term "slip" is understood as meaning the state when the surface speed of the wheel differs from the vehicle speed v during the acceleration of the vehicle wheel. The drive slip limits the transverse force which can be applied to the road by the wheel. The vehicle starts to slip. All of the wheels are in contact here with the roadway surface. Tipping of the vehicle can therefore be prevented. During the drive torque peak, the driven wheel is steered somewhat back in the direction of the direction of travel so that the transverse forces on the vehicle do not increase further since a smaller wheel steering angle $\varphi_{LW}$ produces less transverse acceleration and thereby also less transverse force FQ. The wheel is only steered back to an extent such that the vehicle no longer tips, i.e. the direction of travel is not necessarily reached during the steering back operation.

During the engagement period Δt, the vehicle is intended to be brought away from a state in which the vehicle threatens to tip.

Figure 4:
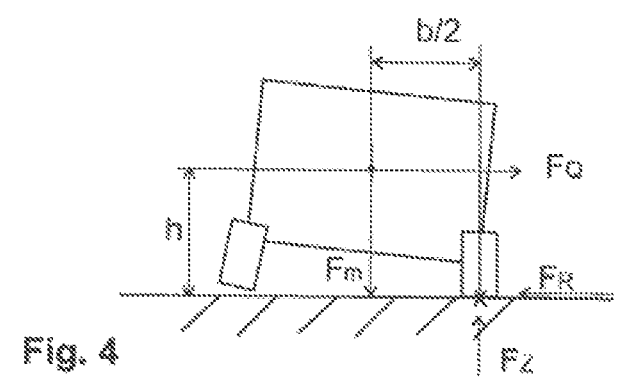
FIG. 4 is a schematic view of the forces acting on the motor vehicle.

The following relationship, as illustrated in FIG. 4, applies here:

$FQ*h=Fm*b/2$, wherein, according to the force equation:

In the transverse direction: $FQ=FR$

In the vertical direction: $FN=Fm=m*g$, wherein m is the vehicle mass, g is the gravitational acceleration and b corresponds to the vehicle width from the vehicle center point as far as the wheel center point, and h is the vehicle height from the roadway as far as the vehicle center point. In this state, the vehicle does not yet tip. However, it is at the limit state with regard to tipping. Therefore, the tire transverse force FR between vehicle wheels and road has to be subsequently reduced. For this purpose, there is the relationship that the drive slip reduces the tire transverse force $F_Q$ which can be transmitted. The spinning vehicle wheels will thereby transmit less transverse force on the loaded side, and therefore the vehicle slips in the transverse direction along a greater bend radius.

Figure 5:
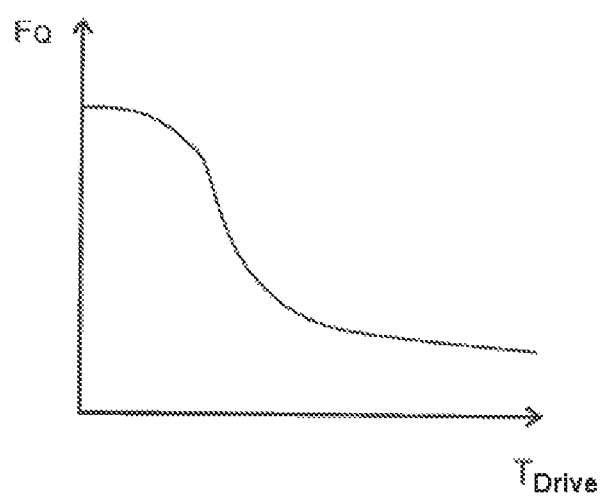
FIG. 5 is a diagram of the profile of the tire transverse force in accordance with the drive torque.

In order to reduce the tire transverse force FR, the drive torque $T_{Drive}$ has to be increased. The relationship between tire force and drive torque is illustrated in FIG. 5.

In order to increase the bend radius, the vehicle transverse force FQ has to be reduced.

$FQ=m*ay$, wherein the transverse acceleration $$ay = \frac{v^2}{l \times \varphi lw \left(\frac{1+v}{vch}\right)^{\wedge}2}$$

wherein l=the axial distance between a wheel center point of a front wheel and a wheel center point of a rear wheel center point along the same vehicle side; m is the vehicle mass, v is the vehicle speed and vch is the characteristic speed.

In order to reduce the tire transverse force, the wheel steering angle $\varphi_{LW}$ has to be reduced because the tires are thereby steered into a straight position and the bend radius becomes greater.

By means of the combination of torque $T_{Drive}$ and wheel steering angle $\varphi_{LW}$, the vehicle slips, but does not tip over, and a more rapid transition into the manual state can be made possible. After a limited period of time $\Delta t$, the driver again takes over the steering, and the torque $T_{Drive}$ and the wheel steering angle $\varphi_{LW}$ are reduced again or no longer imposed. If it is detected that the critical state is no longer present, a change can also be made from the automatic state into the manual state before the engagement time $\Delta t$ has expired.

What is claimed is:

1. A method for preventing roll-over of a motor vehicle in the event of a transverse load change, wherein the motor vehicle has an individual-wheel drive which is configured to drive a wheel that is loaded by the transverse load change independently of the at least one other wheel of the motor vehicle, the method comprising:
    identifying a critical state of the motor vehicle in the event of a transverse load change,
    applying, with the individual-wheel drive, a drive torque to the motor vehicle wheel that is loaded by the transverse load change such that the wheel that is loaded by the transverse load change is caused to slip, and
    steering the motor vehicle wheel that is loaded by the transverse load change in the direction of a direction of travel such that a roll-over of the motor vehicle can be prevented.

2. The method of claim 1 wherein the drive torque is a maximum torque of a drive motor.

3. The method of claim 1 wherein the drive torque drives the wheel that is loaded by the transverse load change in the direction of travel.

4. The method of claim 1 wherein the application of the drive torque and the steering of the wheel that is loaded by the transverse load change take place for a limited period of time which is at least as long as the identified critical state lasts.

5. The method of claim 4 wherein the limited period of time lies within a range of between 0.1 s and 0.3 s.

6. The method of claim 1 wherein the application of the drive torque and the steering of the wheel that is loaded by the transverse load change take place in an automatic steering state of a steering system of the motor vehicle.

7. The method of claim 1 wherein the wheel that is loaded by the transverse load change is the wheel on the outside of a bend in a roadway over which the motor vehicle is traveling.

8. A steer-by-wire steering system of a motor vehicle having a steerable front wheel axle having two steerable wheels, wherein the front wheel axle has an individual-wheel drive that uses a drive controller to individually drive wheel drives assigned to the steerable wheels, wherein an electric steering actuator is provided which controls the position of the steerable wheels, and wherein the drive controller and the steering actuator are configured to carry out the method of claim 1.

* * * * *